(12) United States Patent
Menard et al.

(10) Patent No.: US 7,276,196 B2
(45) Date of Patent: Oct. 2, 2007

(54) PROCESS FOR MANUFACTURING A TRACK AND STRIPPING DEVICE

(75) Inventors: Gilbert Menard, Volvic (FR); Gilbert Gauthier, Cournon-d'Auvergne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 823 days.

(21) Appl. No.: 10/345,733

(22) Filed: Jan. 16, 2003

(65) Prior Publication Data

US 2003/0141631 A1    Jul. 31, 2003

Related U.S. Application Data

(63) Continuation of application No. PCT/EP01/08428, filed on Jul. 20, 2001.

(30) Foreign Application Priority Data

Jul. 24, 2000    (FR) .................................. 00 09701

(51) Int. Cl.
*B29C 45/14*    (2006.01)
*B29C 47/02*    (2006.01)

(52) U.S. Cl. ................... 264/254; 264/334; 425/35; 425/47; 425/34.2

(58) Field of Classification Search .................... None
See application file for complete search history.

(56) References Cited

U.S. PATENT DOCUMENTS 4,066,732 A    1/1978    Redmond, Jr. ............... 264/229
4,246,055 A    1/1981    Henderson ................... 156/138
6,086,811 A    7/2000    Fike ............................ 264/271
6,177,042 B1 *  1/2001    Fike ............................ 264/326

FOREIGN PATENT DOCUMENTS

| CA | 898672 | 4/1972 |
|---|---|---|
| JP | 09076369 | 3/1997 |
| WO | 9104145 | 4/1991 |

* cited by examiner

*Primary Examiner*—Edmund H. Lee
(74) *Attorney, Agent, or Firm*—Buchanan Ingersoll & Rooney

(57) ABSTRACT

A process for manufacturing a track formed from a circumferentially continuous belt made of elastomeric material and including an inner surface and an outer surface. The inner surface is provided with a plurality of drive blocks uniformly arranged on the circumference. The process includes a step in which a cylindrical inner mold formed by first and second cylindrical die-halves is assembled, the two die-halves being movable relative to each other in an axial direction to come into contact with each other at a joint surface. The inner mold includes a radially external laying surface provided with a plurality of uniformly spaced cavities for molding the drive blocks, each cavity being delimited in the axial direction by respective side walls of the first and second die halves. The joint surface of the two die-halves is axially closer to one side wall than to the other side wall. A device for stripping the track from the inner and outer molds is provided.

9 Claims, 8 Drawing Sheets

PROCESS FOR MANUFACTURING A TRACK AND STRIPPING DEVICE

CROSS REFERENCE TO RELATED APPLICATIONS

This is a continuation of international application PCT/EP01/08428 filed Jul. 20, 2001, which was published in French on Jan. 31, 2002 as international publication WO 02/07956 A1 which claims priority of French application 00/09701 filed Jul. 24, 2000.

BACKGROUND OF THE INVENTION

1. The Field of Invention

The invention relates to a process for manufacturing and molding tracks made of elastomeric material. The invention also relates to a device for stripping out such tracks.

2. The Related Art

The use of tracks is developing in many sectors, especially that of agricultural tractors or other civil engineering machines for which the conditions of mixed rolling (both on loose ground and on roads) entail increasing quality requirements for the tracks and also reduced industrial costs.

In the text hereinbelow, the term "elastomeric material" denotes a material comprising at least one elastomer that can be reinforced with a least one reinforcing filler such as, for example, carbon black. Diene elastomers, polyurethanes and thermoplastic rubbers, inter alia, are examples of suitable elastomeric materials.

To produce a track that is circumferentially reinforced with wires or cables, provided on its outer surface with a tread design formed from components in relief intended to make progress on loose ground easier, and also provided with a series of drive blocks in relief on its inner surface to co-operate with a suitable drive means, it is possible to use, by supplying it, a process for producing a drive band formed from a reinforced rubber belt and provided on its outer surface with relief motifs.

For example, Canadian patent No. 898 672 describes a method in which, in a first stage, the belt is produced by winding on a drum formed from components, and, in a second stage, the drum bearing the belt is positioned inside a mold composed of a plurality of radially mobile sectors to mold the relief motifs on the exterior of the band. This process has the drawback of requiring a complex production of a drum, the components of which must be retractable after molding and vulcanization of the band so as to allow the band to be stripped out after molding.

Japanese document JP-09/076,369 describes a manufacturing process in which the inner drum is formed from two symmetrical cylindrical die-halves that may be moved axially relative to each other so as to strip out a track after molding and vulcanization on the drum. In the track-manufacturing position, the drum, after assembly of the die-halves, has a radially external surface on which the track is made. The laying surface is provided with a plurality of cavities for molding the drive blocks of the track. The joint plane of the cylindrical die-halves is located axially in the middle of the block molding cavities. After filling the cavities with a blend, the track reinforcement armatures are installed together with the layers of blends of suitable elastomeric materials. Finally, the track blank is covered in its non-molded and non-vulcanized form with a plurality of mold components which bear on their radially internal surface hollows prefilled with blend to mold the track tread.

This process has a certain number of drawbacks, including:

- it is imperative to determine with very high precision the volumes of the blends and of the armatures, since the molding volume delimited by the outer mold and the base cylindrical drum (acting as the inner mold) very precisely regulates the volume of the track to be molded, and since the elastomer blends used are, by their nature, incompressible;
- the overhang of the various outer mold components requires high-precision mechanics to avoid having areas of overthickness or areas of imperfect molding when the hollows of the outer mold are not filled before being applied against the belt; and
- during the stripping of the track from the inner mold by axial separation of the two die-halves constituting the mold, the track randomly follows one or other of the die-halves, which is not convenient in an industrial environment in which such a large, heavy track needs to be manipulated, without knowing, in principle, which side of the drum to take it from in order to move it.

There is consequently a need to develop a process for manufacturing a large-sized track, which ensures a very high quality production of the track (in particular absence of molding defects) for which the drawbacks that have just been mentioned are eliminated.

SUMMARY OF THE INVENTION

According to the invention, a process is proposed for manufacturing a track formed from a circumferentially continuous belt made of elastomeric material, comprising at least one reinforcement armature whose reinforcements, in the form of wires or cables, are arranged parallel to each other and are substantially aligned with the circumference of the track, the belt having an inner surface and an outer surface, the outer surface being provided with a tread design formed from components in relief intended to come into contact with the ground, the inner surface being provided with a plurality of drive blocks uniformly arranged on the circumference.

The process according to the invention comprises the following steps:

(a) assembling an inner mold formed by a first and a second cylindrical die-half on the same axis, the two die-halves being able to be moved relative to each other in the axial direction to come into contact with each other along a joint surface and to form a laying surface radially external to the inner mold intended for molding the radially internal surface of the track, such laying surface being provided with a plurality of uniformly spaced cavities for molding the drive blocks, each cavity being delimited in the axial direction by a first and a second side wall, the first side wall belonging to the first of the die-halves and the second side wall belonging to the second of the die-halves, the joint surface of the two die-halves being, on the laying surface, axially closer to the first side wall than to the second side wall;

(b) filling the cavities with at least one suitable blend to form the drive blocks;

(c) laying the belt constituents (elastomer blends and reinforcement armatures) on the inner mold and radially external to the blocks to ensure contact between the belt blend and the block blend;

(d) laying the track tread blend radially external to the belt to finish the track blank;

(e) transferring the track blank carried by the inner mold and insertion thereof inside an outer mold formed from a plurality of sectors, the sectors having, in the molding position, a radially internal molding surface to mold the track tread design, each sector comprising of a plurality of components;

(f) closing the outer mold by radially bringing the various sectors of the outer mold towards the axis of rotation, to mold and vulcanize the track;

(g) after molding and vulcanizing, radially opening the sectors of the outer mold;

(h) transferring the inner mold carrying the molded and vulcanized track to a device for disassembling the die-halves and stripping out the track;

(i) axially immobilizing one of the die-halves of the inner mold and moving the other die-half in the axial direction to distance it axially from the immobilized die-half until completely separated, the track remaining attached to the second die-half; and (j) immobilizing the track and moving the second die-half axially so as to strip out the track by sliding it relative to the second die-half.

The joint surface of the two die-halves is said to be "closer to the first side wall than to the second side wall" since it does not pass through the midplane of the cavities intended for molding the drive blocks (the midplane of the cavities being the plane perpendicular to the axis of the mold and axially dividing each cavity into two substantially equal parts). Preferably, the distance between the joint surface and the midplane of the cavities formed on the inner mold is greater than half the distance between such midplane and the first of the side surfaces of the cavities on the first die-half. Advantageously, this joint surface is tangential to the first of the side surfaces of the cavities on the first die-half.

The fact that the joint surface of the two die-halves constituting the inner mold is positioned outside the midplane of the cavities formed on the inner mold (in the assembly configuration for the manufacture of a track) makes it possible to systematically maintain the track on the second die-half during the stripping operation, and thus to facilitate the arrangement of the manufacturing workshop in consequence.

The filling of the inner mold cavities may be performed by manually supplying block blanks manufactured at a specific station.

Advantageously, the filling of the cavities may be performed by extrusion or injection molding of a blend inside the cavities for molding the drive blocks before laying the armatures and other blends constituting the track belt. The filling by extrusion or injection molding makes it possible to avoid operations, that are always difficult, of manipulation and brightening of the contact surfaces between different blends to maintain a satisfactory crude bonding between the block blend and the armature blend placed radially on top.

According to one variant of the invention for optimizing the cycle time of the process, the station for extrusion or injection molding of the blend in the cavities is combined with the stripping station, such that the manufacture of a new track can begin immediately after stripping out the previous track, even though the two die-halves have not finished cooling.

Moreover, and so as to limit unwanted flows of rubber that can form molding defects, such as flash, during the molding operation, while at the same time reducing the sensitivity to the volume dispersions between the raw track blanks to be molded and vulcanized successively in the same mold, it is prudent to arrange for the components of the sectors of the outer mold to be individually mobile, along a direction of approach to or of distancing from the axis of the mold at least on a final molding course, such components also being circumferentially mobile with respect to each other at least while they are moving along the course. The latter arrangement makes it possible to preserve the integrity of the outer mold by avoiding any premature deterioration during the molding operation.

According to this variant of the invention, it may be considered that the movement of the components of the outer mold is very substantially radial in all positions circumferential to the molding surface of the components.

According to another advantageous variant, the outer mold comprises means providing an elastic repulsion between the components of the sectors so as to ensure that these components all remain equidistant to each other. One embodiment comprises producing housings on the transverse faces of each component in the circumferential direction that can each receive a member capable of providing a repulsive force between the components.

The advantage afforded by this type of mold combined with the manufacture of a raw track blank on a rigid inner mold lies in the fact that a certain amount of elasticity is imparted to the outer mold; that is to say, a certain capacity is provided to increase the volume of the molding cavity slightly so as to follow the expansion of the elastomeric materials resulting from the increase in temperature and, for example, at and above a predetermined molding pressure threshold, while at the same time perfectly distributing the play between the components of the outer mold.

Advantageously, at least one of the two die-halves constituting the inner mold comprises suitable elastic clamping means for allowing the first and second die-halves to be kept in contact throughout all operations of manufacturing a track blank and of molding. The expression "elastic clamping means" means a means or a plurality of means ensuring the mechanical behavior of the assembly of the die-halves, while at the same time allowing a suitable and uniform play to be taken up between the die-halves during the molding and vulcanization as soon as a preselected molding pressure threshold is reached in the rubber forming the blocks. These clamping means are released after vulcanization of a track to allow the two die-halves to be separated and the track to be stripped out.

The combination of the preceding arrangements makes it possible to achieve high-quality molding while at the same time avoiding the deterioration of the outer or inner molds that might result from an uncontrolled pressure increase due to the expansion of the blends during the molding operation.

In order to strip the track from the inner mold after stripping from the outer mold, a stripping device is proposed, comprising:

a frame resting on the floor of the manufacturing workshop, to receive the inner mold provided with a track after molding of the track;

first and second blocking means and a gripping means;

the first blocking means being provided on the frame to position the first die-half of the inner mold axially and to limit its axial movement relative to the frame;

the second blocking means being provided on the frame to determine the axial position of a vulcanized track and to limit its axial movement relative to the frame; and the gripping means making it possible, once the inner mold with the vulcanized track is in place on the device and the first blocking means are blocking the axial movement of the first die-half of the mold, to move the second die-half axially so as to separate it from the first die-half and to release the second die-half from the track, the track being blocked axially by the second blocking means.

In one variant, the inner mold is mounted on the frame such that its axis is vertical, the first die-half being located vertically above the second die-half. In this case, the first blocking means are adapted to limit the gravitational descent of the first die-half towards the frame, and the second blocking means are adapted to limit the gravitational descent of the track towards the frame and to detach it from the second die-half.

This same device is advantageously used to assemble the first and second die-halves so as to form the inner mold in order to manufacture a new track.

BRIEF DESCRIPTION OF THE DRAWINGS

Other characteristics and advantages of the invention will emerge from the description given below with reference to the following figures, which illustrate the steps of the process for manufacturing a large-sized track intended, inter alia, to equip a vehicle of agricultural or civil engineering type, in which.

DETAILED DESCRIPTION OF EXEMPLARY EMBODIMENTS

Figure 1:
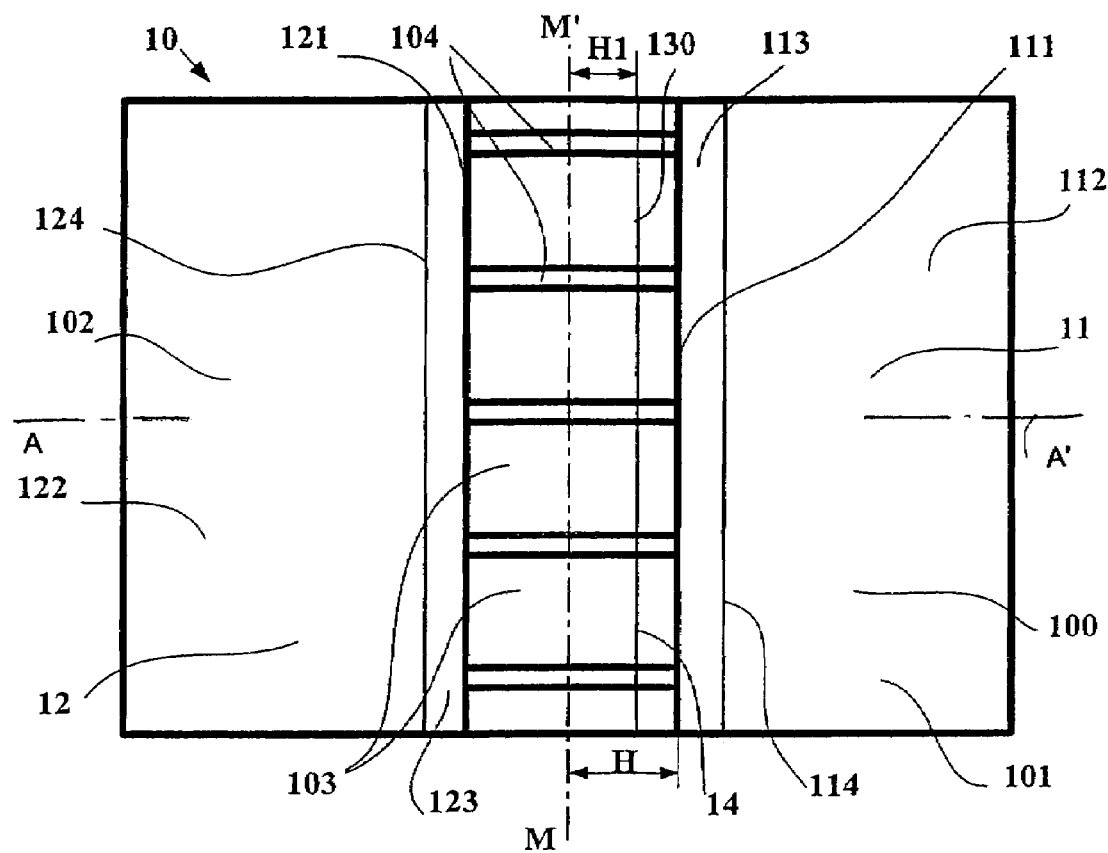
FIG. 1 is a plan view of a portion of the molding surface of the inner mold in the position for the insertion of the rubber forming the drive blocks.
Figure 2:
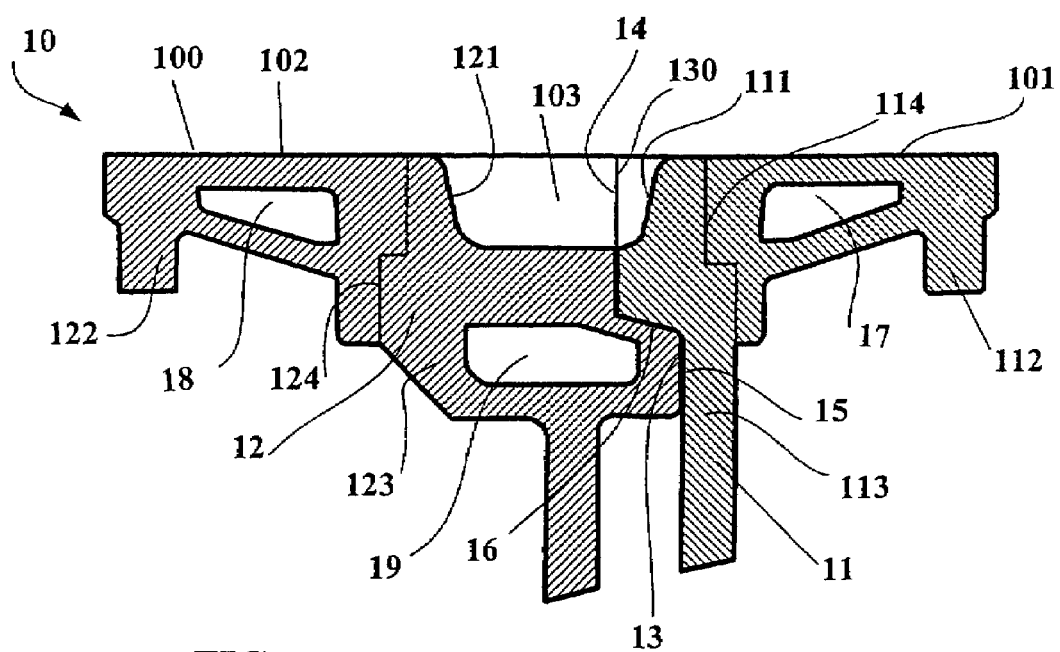
FIG. 2 shows, in axial cross section, the inner mold after joining together the two die-halves and before laying the constituents of the track blank.

FIGS. 1 and 2 show partial views of the same inner mold 10 intended to be used to manufacture a track blank. In FIG. 2, showing a radial cross section of the mold 10 (that is to say, containing the axis of the inner mold), there can be seen a first cylindrical die-half 11, whose axis merges with the axis of the inner mold, and a second cylindrical die-half 12, whose axis also merges with the axis of the inner mold, the die-halves being represented in the assembly position before the start of manufacture of a new track. Once assembled, the die-halves 11, 12 are in contact along a joint surface 13 (FIG. 2) formed in the present case from two flat surfaces 14, 15 perpendicular to the axis of the inner mold 10 and from a frustoconical surface 16 of the same axis, the frustoconical surface 16 linking the flat surfaces 14, 15. Clamping means (diagrammatically represented in FIG. 11) keep the die-halves 11, 12 securely attached throughout the stage of manufacturing and molding the track.

In the position shown in FIGS. 1 and 2, the die-halves 11, 12 forming the inner mold 10 have a radially external laying surface 100 which serves as a base for laying the constituent components of the track blank. This laying surface 100, which can be seen in FIG. 1 showing a partial view of the outer surface of the inner mold 10, has two cylindrical laying parts 101 and 102 of substantially the same axial width and, in the middle part, a plurality of cavities 103 uniformly spaced in the circumferential direction for molding the drive blocks of a track blank. The cavities 103 are delimited in the circumferential direction by axially oriented grooves 104 and in the axial direction A-A' by side walls 111 and 121, the wall 111 belonging to the first die-halve 11 and the other side wall 121 belonging to the other die-half 12.

In FIGS. 1 and 2 can be seen the line 130 of the joint surface 14 on the laying surface 100 of the inner mold 10. The line 130 is located axially between the line of the midplane MM' of the inner mold, axially dividing the mold into two parts of substantially equal width, and the side wall 111 of the first die-half 11 limiting the cavities 103. In the present case, the distance Hi between the line 130 and the midplane MM' is greater than 50% of the average distance H between the midplane MM' and the side wall 111.

Advantageously, the first die-half 11 is formed by assembling an axially external part 112 and an axially internal part 113 bearing on each other on a joint surface 114. Similarly, the second die-half 12 is formed by assembling an axially external part 122 and an axially internal part 123 bearing on each other on a joint surface 124. Thus, it is easy to adapt the total width of the laying surface 100 to the size of the track to be manufactured, while at the same time conserving the middle part of the inner mold, the respective widths of the various parts 113, 114, 123, 124 possibly being identical or different.

As represented in FIG. 2, each die-half 11, 12 comprises, under each laying surface 101, 102, a channel 17, 18 extending in the circumferential direction and linked to means, not shown here, for circulating at least one fluid at the desired temperature during the molding and vulcanizing stage. Advantageously, at least one additional channel 19 is provided in the second die-half 12 radially under the cavities 103 so as to establish a suitable vulcanization temperature that is optionally different from the temperature of the fluids circulating in the other channels 17, 18 located under the other parts of the track, so as to optimally adjust the vulcanization of the various parts of a track, taking into account the different thicknesses of the parts.

The example described in FIGS. 1 and 2 shows laying surfaces 101, 102 that are essentially cylindrical. Of course, the invention is not limited to this type of surface of cylindrical shape. It is possible, for example, to use for at least one laying surface a frustoconical shape or a shape with convexity or concavity. Preferably, the radius of curvature of this shape is greater than 5 m.

Figure 3:
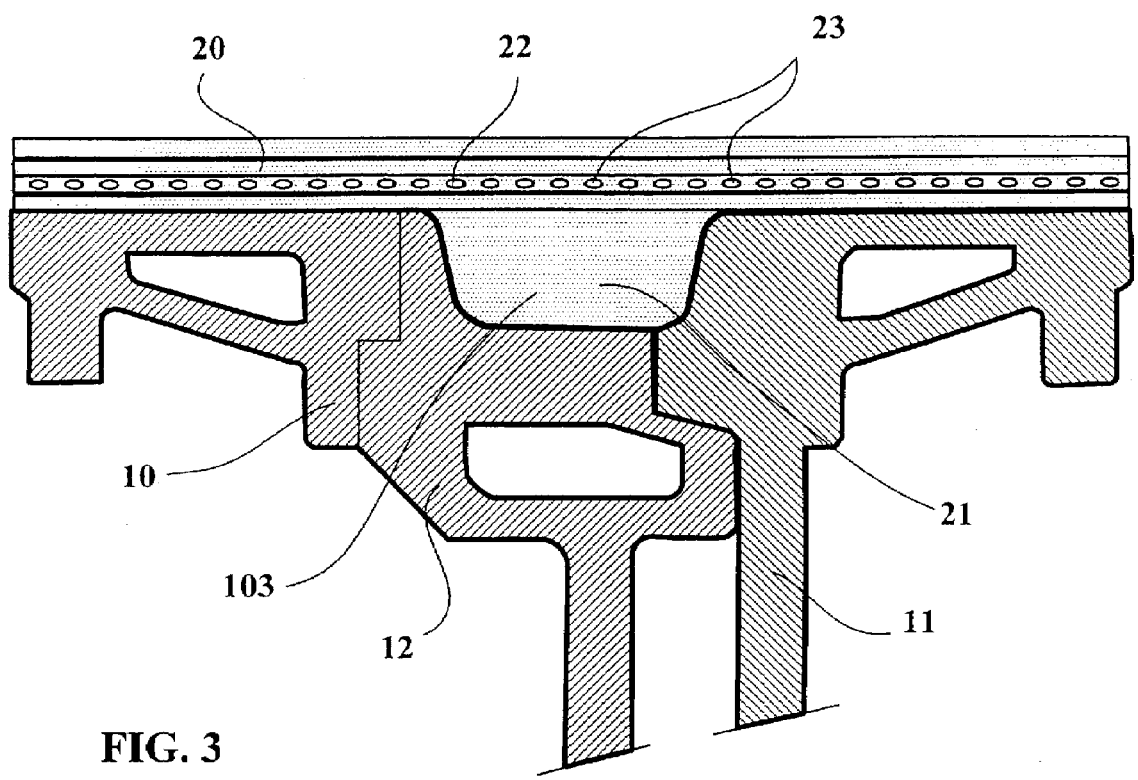
FIG. 3 shows, in axial cross section, an inner mold after laying only some of the constituents of a track blank.

FIG. 3 shows, on a radial cross section containing the axis of rotation of the inner mold, a step for the manufacture of a track blank 20 according to the process of the invention. On the inner mold 10, corresponding to the mold described with the support of FIGS. 1 and 2, arranged so that it can rotate about its axis A-A' placed vertically, rubber blend has been introduced extrusion into the cavities 103 to form drive blocks 21. Next, the various layers of rubber blend 22 and armatures 23 are arranged successively and, for example, by winding radially on the exterior of the inner mold so as to come into contact with the blocks 21 and to hold them in place in the cavities 103.

Figure 4:
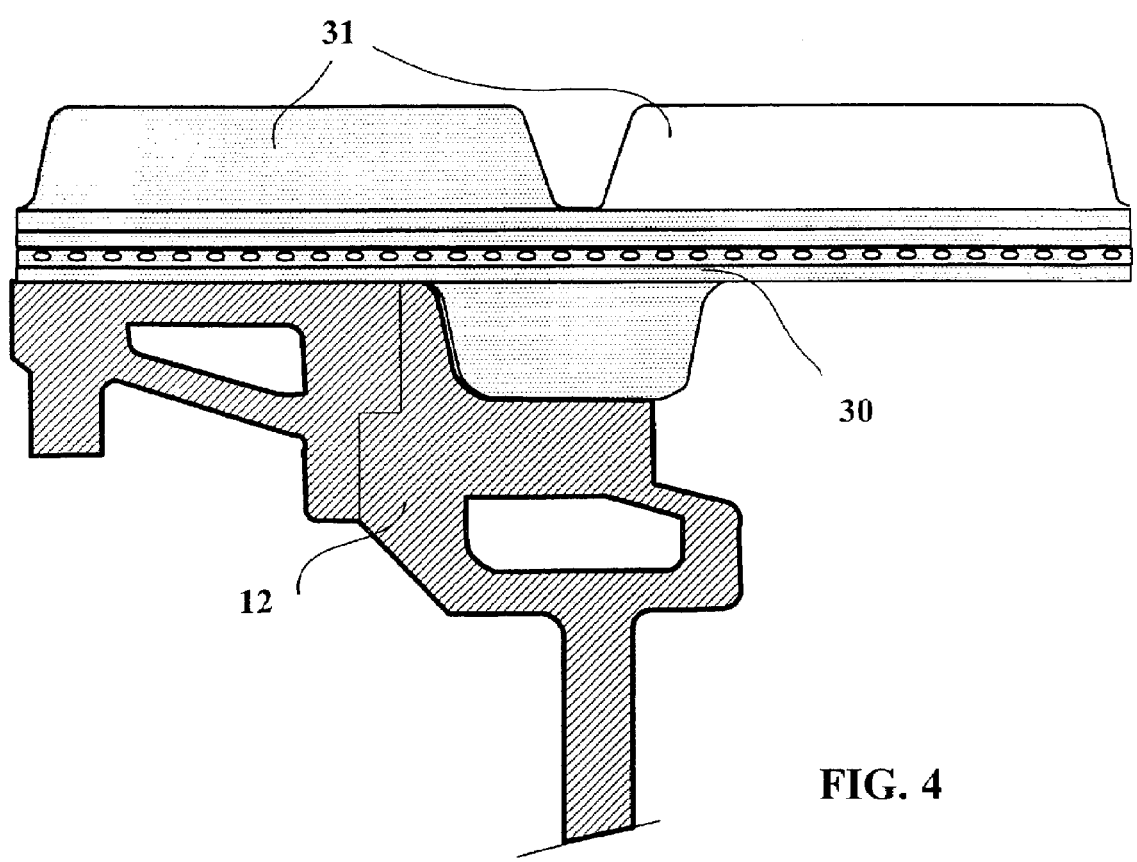
FIG. 4 shows, in axial cross section, the inner mold of FIG. 3 after the stage of stripping of the first die-half.

To finish the manufacture of the track blank, rubber bars, not shown in FIG. 3, are arranged radially on the outside of the blank 20 to form the tread design 31 of the track that can be seen in FIG. 4, showing a track 30 after molding and vulcanization. In one advantageous variant, which is well known to those skilled in the art, the manufacture of the track blank is completed by rolling of sheets or profiles of the amount of rubber required to form the bars of which the tread design is composed.

After manufacturing the blank, the assembly comprising the inner mold and the track blank is placed inside an outer mold intended to mold the track tread design. In addition to the molding, the vulcanization of the rubber blends is also performed in this configuration by supplying heat to both the inner mold and the outer mold.

After molding and vulcanizing a track, it is stripped out in order systematically to obtain the configuration represented in FIG. 4 according to which the vulcanized track 30 rests only on the second die-half 12, the first die-half 11 having been removed. The procedure for stripping the track from the inner mold is explained with the aid of FIGS. 5 to 8 showing views in cross section of a device according to the invention.

Figure 5:
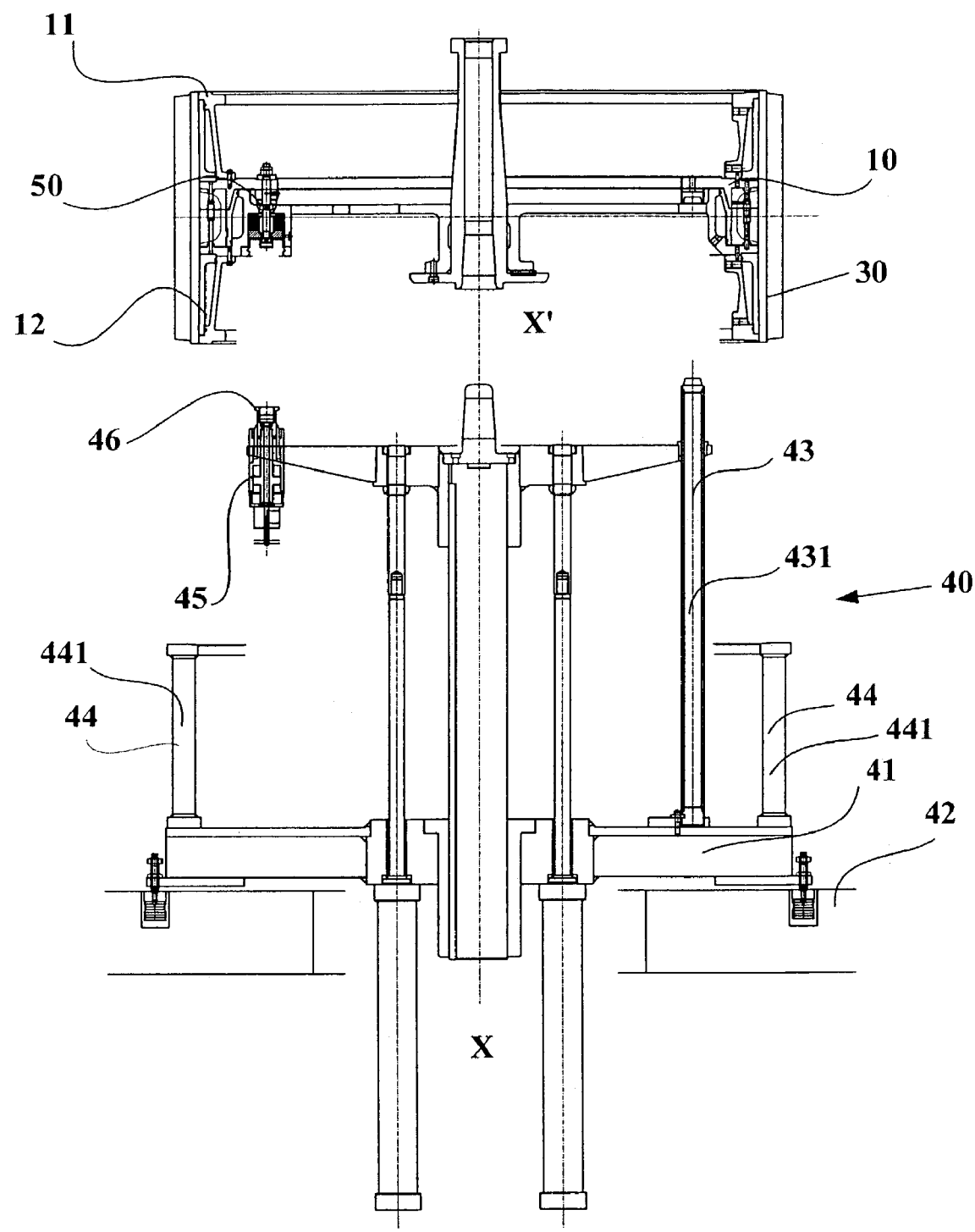
FIGS. 5 to 8 show the various steps for stripping a track from the inner mold using a stripping device according to the invention.

In FIG. 5, there is seen a device 40 for stripping out a vulcanized track 30 carried by the inner mold 10 which has just been described with the aid of FIGS. 1 to 4. The stripping device 40 comprises a frame 41 resting on the floor 42 of the workshop, the frame 41 having a vertically oriented axis XX'. This frame 41, intended to receive the inner mold 10 provided with a track 30 after molding of the track, comprises first and second blocking means 43, 44 and gripping means 45 to maneuver the inner mold 10.

The first blocking means 43 includes in the present case a plurality of rods 431 fixed to the frame 41 and of vertical axis parallel to XX', whereas the second blocking means 44 includes a plurality of rods 441 also fixed to the frame 41 and of vertical axis. The rods 441 forming the second blocking means 44 are shorter than those 431 forming the first blocking means 43.

The gripping means 45 are slidably mounted along the vertical axis XX' of the frame 41, to take and move the inner mold 10 along the axis XX' of the frame. The gripping means 45 also have tools 46 capable either of locking the assembly of the first and second die-halves 11, 12 of the inner mold 10, or of unlocking them to perform the stripping by acting on members 50 connecting the die-halves 11, 12.

In the position in FIG. 5, a track 30 on its inner mold 10 is conveyed, by suitable means, vertically above the first and second blocking means, the axis of the inner mold 10 merging with the axis XX' of the frame, the second die-half 12 being placed vertically below the first die-half 11. The gripping means 45 are moved vertically upwards until they come into contact with the inner mold.

Figure 6:
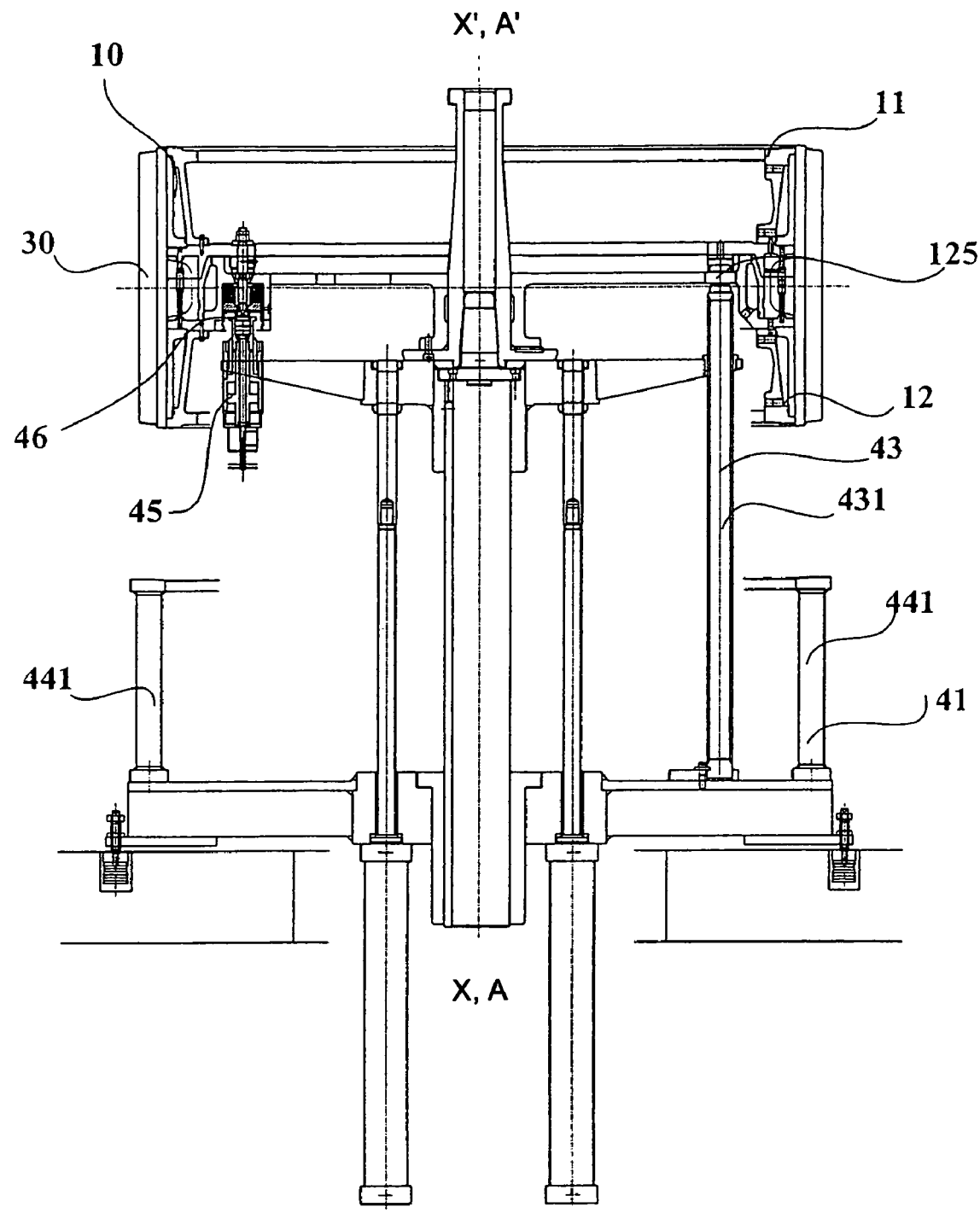

In a following stage, shown in FIG. 6, the inner mold 10 is brought to bear on the rods 431 of the first blocking means 43, the rods 431 passing through holes 125 provided on the second die-half 12 so that the end of each rod 431 that is furthest from the frame 41 is in contact with the first die-half 11, and is thus able to limit the gravitational descent of the first die-half 11 towards the frame 10. In this stage, the unlocking of the first and second die-halves is performed by means of the tools 46 carried by the gripping means 45.

Figure 7:
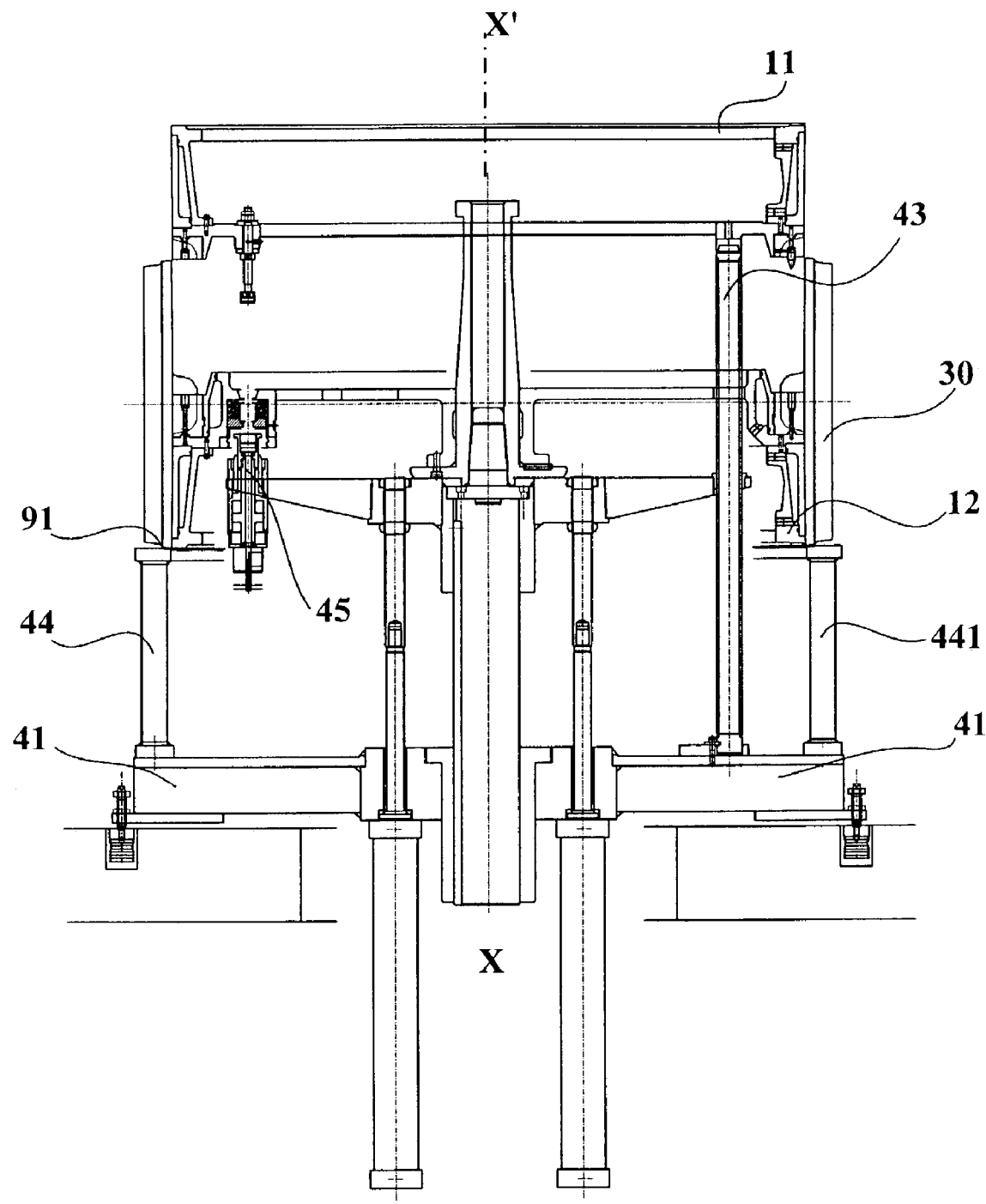
Figure 8:
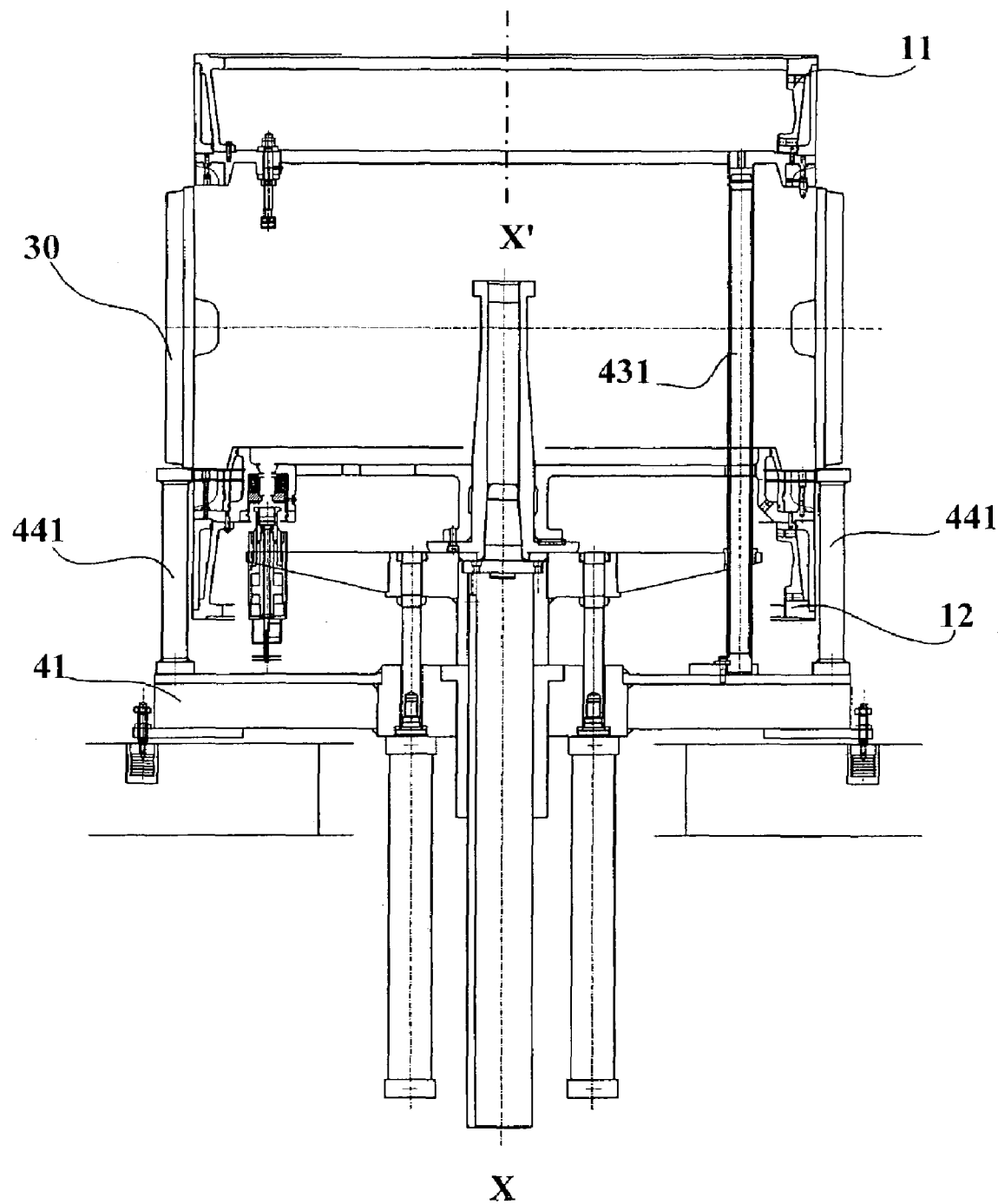

In the following step, shown in FIG. 7, the gripping means 45 entrain the second die-half 12 towards the frame 41 in a movement parallel to the direction XX'. In this movement, the first die-half 11 rests against the first blocking means 43 and the track 30 follows the second die-half 12. This movement is continued until, in a first stage, the lower axial edge 91 of the track 30 bears against the second blocking means 44 and, in a second stage, the second die-half 12 is extracted by sliding inside the track 30 bearing against the rods 441 (as may be seen in FIG. 8 the references used in this FIG. 8 referring to the same components already defined). Finally, the track 30 is removed from the stripping device by any suitable handling means.

Advantageously, the rods 441 of the track blocking means 44 are designed so that the distance relative to the axis XX' of the frame 41 can be adjusted, so as to adapt to the stripping of tracks of different sizes.

The application of the principle described with a stripping device comprising a frame of vertical axis for stripping out a track, the axis of the track also being vertical, is within the capability of a person skilled in the art should he wish to keep the axis of the track in the horizontal position.

Figure 9:
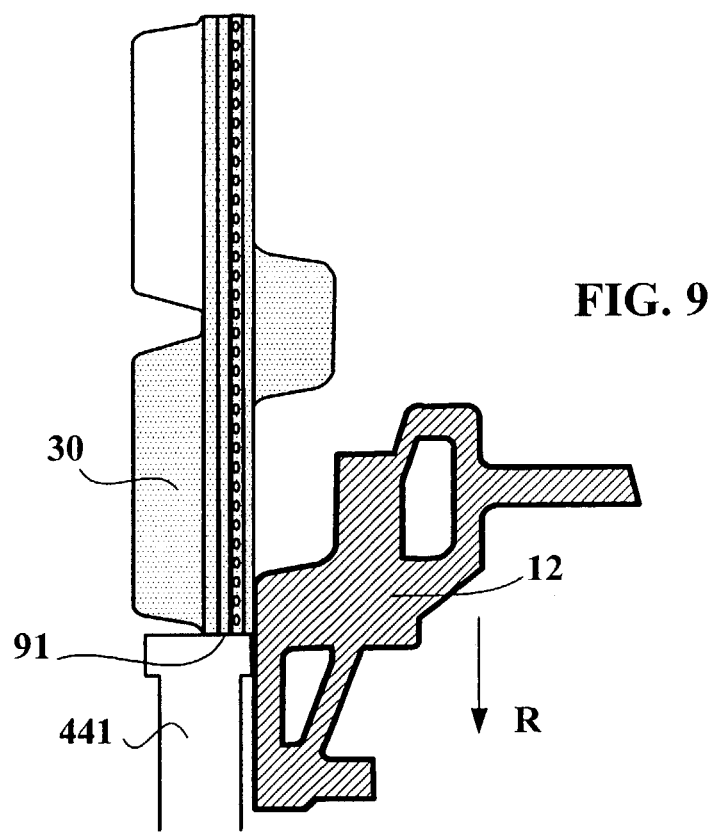
FIG. 9 shows, in radial cross section, an enlarged view of the track during the stripping operation.

FIG. 9 shows a detail view of the stripping stage of the device that has just been described. In this stage, the axially lower edge 91 of the track 30 bears against the end of the rods 441, while the second die-half 12 has partially slid inside the track 30 along the vertical direction symbolized by the arrow R. After complete stripping, handling means (not shown) take the track 30 and convey it to a storage station, while the gripping means 45 push the second die-half 12 upwards so as to reconstitute the inner mold in order to manufacture a new track.

Figure 10:
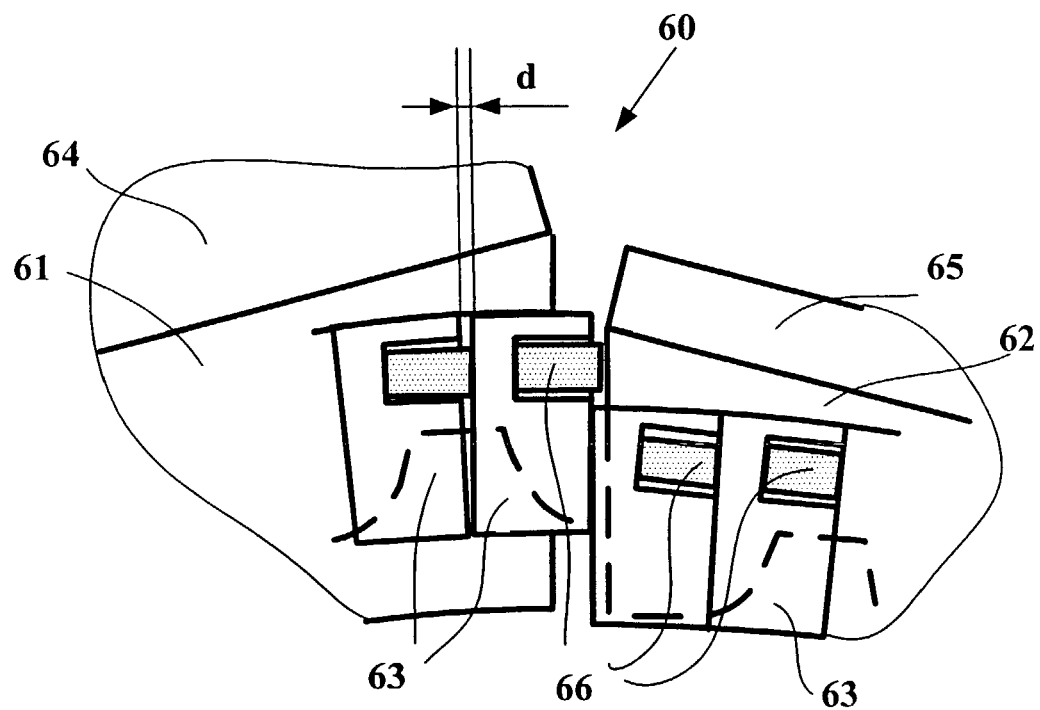
FIG. 10 shows, in partial circumferential cross section, two sectors of the outer mold, on of the sectors being represented in the closed position for molding and vulcanizing a track, and the other sector being represented in the open position.

FIG. 10 shows a partial view of two sectors 61, 62 of the outer mold 60, each sector comprising a plurality of components 63 for molding the tread design motifs of a track. Each of the components 63 has on one of its faces opposite an adjacent component 63 a member 66 capable of exerting an elastic repulsion force between two adjacent components 63 so as to optimally adjust the movements of the components 63 during the closing and opening of the sectors of the outer mold and to minimize the molding defects in the areas of connection between two components. In addition, means not shown here make it possible to control the opening and to limit the opening in the event that a pressure threshold for the molding of a track is exceeded, resulting, for example, from an excessive amount of blend relative to the volume delimited by the inner and outer molds.

The sector 61 is shown in the open position of the outer mold for stripping out the track, and the sector 62 is shown in the closed position of the outer mold for molding the track tread design.

Each sector 61, 62 is carried, respectively, by a plate 64, 65 that has heating means intended for vulcanizing the rubber blends.

On the sector 61 shown in the open position, the components are separated from each other with a play "d" that is substantially uniform irrespective of the components under consideration; this play "d" is reduced or eliminated in the molding position (as may be seen with the sector 62).

Figure 11:
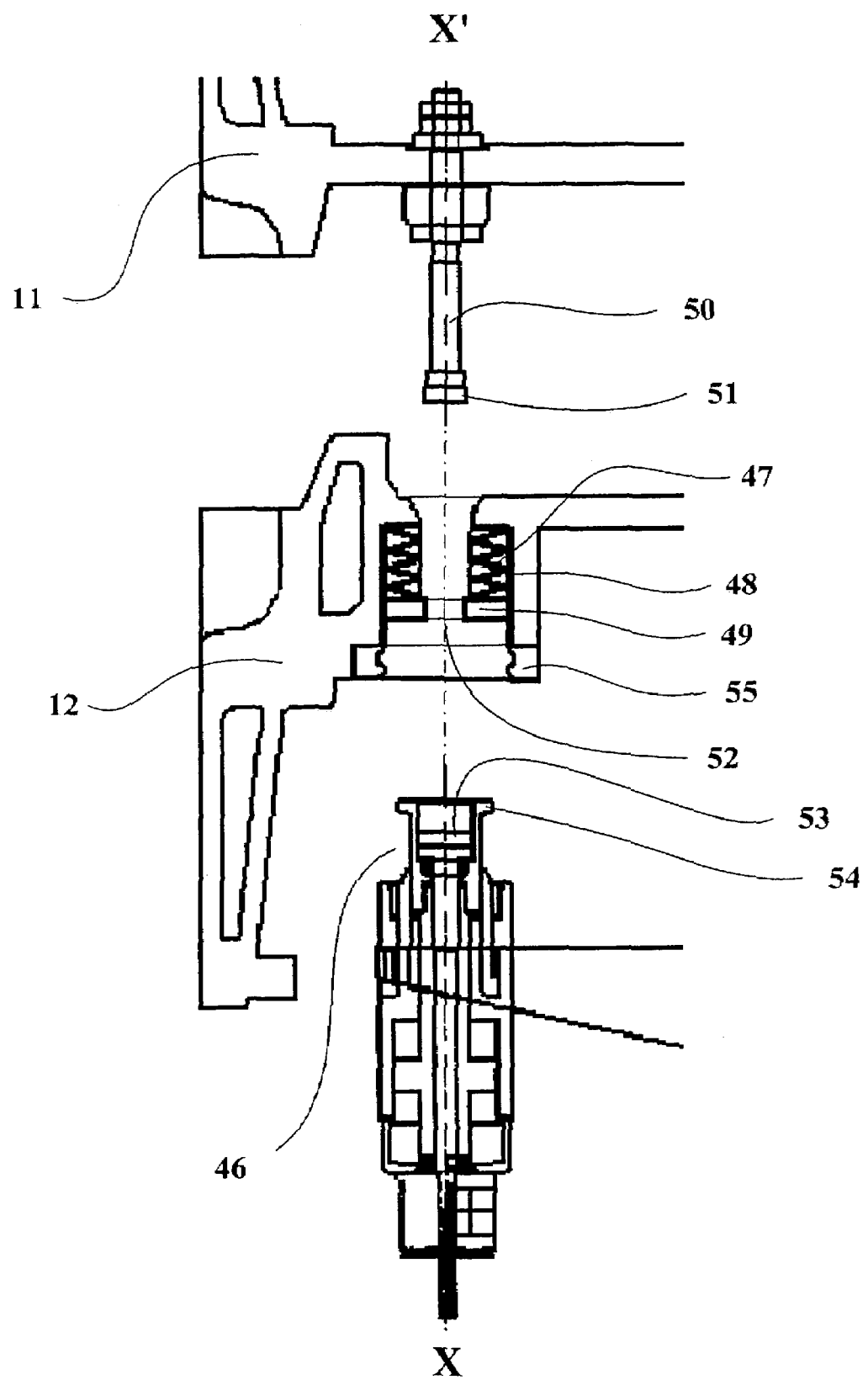
FIG. 11 shows, in axial cross section, a diagrammatic view of the elastic clamping means provided between the first and second die-halves forming the inner mold according to the invention.

FIG. 11 shows a detail view in radial cutaway of the clamping means for assembling the first and second die-halves 11 and 12. In FIG. 11, the first and second die-halves 11, 12 are shown in an unassembled configuration corresponding especially to FIG. 7. The first die-half 11 carries a rod 50 that is securely fastened and substantially aligned with the axial direction of the die-half (corresponding to the direction XX' in FIGS. 5 to 8). The rod 50 comprises at its end that is furthest from the die-half 11 an oblong-shaped crown 51 intended to engage with elastic clamping means 47 provided on the second die-half 12. More specifically, the second die-half 12 comprises, opposite each rod 50 of the first die-half, a housing 52 passing through the second die-half in a direction parallel to the axis of the inner mold and intended to receive the rod 50 so as to assemble the die-halves 11, 12. Inside the housing 52 are arranged clamping means 47 comprising a plurality of Belleville washers 48 covered with a ring 49, the washers 48 and the ring 49 being provided so as to allow the introduction of the end crown 51 of the rod 50 and the rod 50 into the housing 52. The ring 49 can be moved inside the housing 52 in the direction XX' along a predetermined course up to a ring 55. The rod 50 is locked, after it has been introduced into the housing 52, by a 90° rotation about its axis so as to block the crown 51 against the ring 49. In this locking position, the ring 49 exerts on the rod 50 via the crown 51 forces that tend to press the first die-half 11 against the second die-half 12. Adjustment of the clamping force and of the elasticity of such clamping is obtained by providing a suitable number of housings 52 and Belleville washers 48 with suitable properties. This adjustment makes it possible, during the molding of a track, to adjust and limit the internal molding pressure as desired. Specifically, once a preset threshold is reached, the two die-halves 11, 12 can be substantially separated from each other while remaining attached.

In order to perform the operation for assembling the die-halves (and also the disassembly operation), the tool 46 shown very diagrammatically in FIG. 11 comprises an oblong-shaped flange 54, intended to be blocked in the ring 55 fixed in each housing 52 of the second die-half 12 after approach and rotation by a quarter-turn of the flange 54 about the axis XX'. The tool 46 also comprises a central head 53 intended to engage with the rod 50 to rotate it and produce the rotation of the rod 50 so as to allow it to come out of the housing 52.

In order to disassemble the die-halves, the tool 46 is fixed to the second die-half 12 of the inner mold, and the flange 54 of the tool 46 bears against the ring 49 to move it into its housing by compressing the washers 48. The head 53 of the tool 46 then turns the rod 50 by a quarter-turn to allow the crown 51 and the rod 50 to come out of the housing 52.

The process described is particularly advantageous since it makes it possible to perform the molding and vulcanization of a track in a single stage, while at the same time ensuring correct positioning of the armatures (and in particular of the armature comprising reinforcements arranged circumferentially) and also ensuring the integrity of the molding means.

The invention is not limited to the examples described and shown, and various modifications may be made thereto without departing from its scope.

What is claimed is:

1. A process for manufacturing a track formed from a circumferentially continuous belt made of elastomeric material comprising at least one reinforcement armature whose reinforcements, in the form of wires or cables, are arranged parallel to each other and are substantially aligned with the circumference of the track, the belt having an inner surface and an outer surface, the outer surface being provided with a tread design formed from components in relief intended to come into contact with the ground, the inner surface being provided with a plurality of drive blocks uniformly arranged on the circumference, the process comprising the steps of:

(a) assembling an inner mold formed by first and second coaxial cylindrical die-halves, said two die-halves being able to be moved relative to each other in the axial direction to come into contact with each other along a joint surface and to form a laying surface radially external to the inner mold intended for molding the radially internal surface of the track, said laying surface being provided with a plurality of uniformly spaced cavities for molding the drive blocks of the track, each cavity being delimited in the axial direction by first and second side walls, the first side wall belonging to the first die-half and the second side wall belonging to the second die-halve, said joint surface of the two die-halves being, on the laying surface, axially closer to the first side wall than to the second side wall;

(b) filling the cavities with at least one suitable elastomer blend to form the drive blocks;

(c) forming the belt by laying at least one elastomer blend and at least one reinforcement armature on the inner mold and radially external to the drive blocks to ensure contact between the belt blend and the block blend;

(d) laying the track tread blend radially external to the belt to form a track blank;

(e) transferring the track blank carried by the inner mold to an outer mold formed by a plurality of sectors, said sectors having, in the molding position, a radially internal molding surface to mold the track tread design;

(f) closing the outer mold by radially bringing the sectors of the outer mold towards the axis of rotation, to mold and vulcanize the track;

(g) after molding and vulcanizing, radially opening the sectors of the outer mold;

(h) transferring the inner mold carrying the molded and vulcanized track to a stripping device;

(i) axially immobilizing the first of the die-halves of the inner mold and moving the second of the die-halves in the axial direction to distance it axially from the immobilized first die-half until completely separated, with the track remaining attached to the second die-half; and (j) axially immobilizing the track and moving the second die-half axially so as to strip out the track by sliding it relative to the second die-half.

2. The process for manufacturing a track according to claim 1, wherein the distance between the joint surface and a midplane MM' axially dividing each cavity into two substantially equal parts is greater than half the distance between said midplane and the first side walls of the cavities on the first die-half.

3. The process for manufacturing a track according to claim 2, wherein the joint surface is tangential to the first side walls of the cavities on the first die-half.

4. The process for manufacturing a track according to claim 1, wherein at least one of the die-halves forming the inner mold comprises suitable clamping means and elastic repulsion means between the die-halves to ensure both the mechanical behavior of the assembly of the die-halves, and the taking up of a suitable, uniform play between the die-halves during the molding and vulcanization as soon as a preselected molding pressure threshold is reached by the blend inside the cavities.

5. The process for manufacturing a track according to claim 1, wherein each sector of the outer mold comprises a plurality of components that are individually mobile, along a direction of approach to or of distancing from the axis of the mold at least on a final molding course, said components also being mobile with respect to each other at least while they are moving along said course.

6. The process for manufacturing a track according to claim 5, wherein the outer mold comprises means for providing an elastic repulsion between the components of the sectors, so as to ensure that said components all remain equidistant to each other.

7. The process for manufacturing a track according to claim 1, wherein the filling of the cavities of the inner mold is performed by extrusion or injection molding of a blend inside said cavities before laying the other constituents of the track blank.

8. The process for manufacturing a track according to claim 7, wherein the station for extrusion or injection molding of the blend in the cavities is combined with the stripping station, such that the manufacture of a new track blank follows the stripping of a molded and vulcanized track, so as to optimize the cycle time of the process.

9. The process for manufacturing a track according to claim 1, wherein the two die-halves of the inner mold are each provided with at least one channel for circulating a fluid at a temperature to vulcanize the elastomer blends, at least one channel being provided radially under the cavities, the temperature of the fluid circulating in said one channel being different from the temperature of the fluids circulating in the other channels.

* * * * *